Feb. 10, 1970  J. H. GOLOTA  3,495,057
DUAL SLIDE VALVE WITH LOST MOTION MEANS FOR GAS BLAST BREAKER
Filed Nov. 6, 1967  8 Sheets-Sheet 1

INVENTOR.
JOHN H. GOLOTA
BY
OSTROLENK, FABER, GERB & SOFFEN
ATTORNEYS

Feb. 10, 1970  J. H. GOLOTA  3,495,057
DUAL SLIDE VALVE WITH LOST MOTION MEANS FOR GAS BLAST BREAKER
Filed Nov. 6, 1967  8 Sheets-Sheet 3
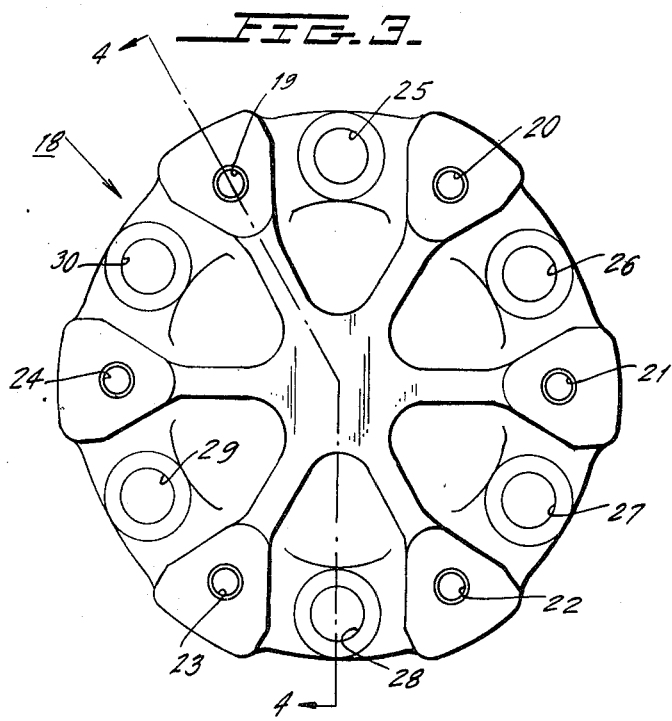
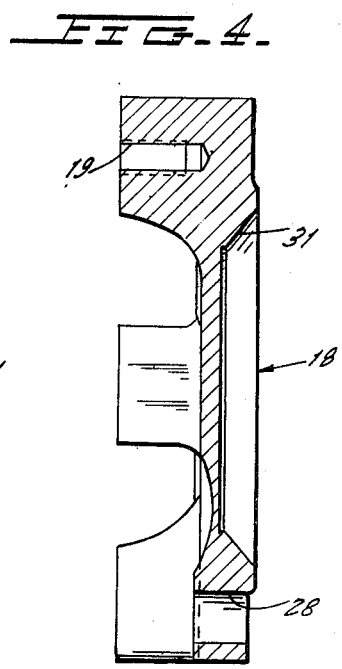
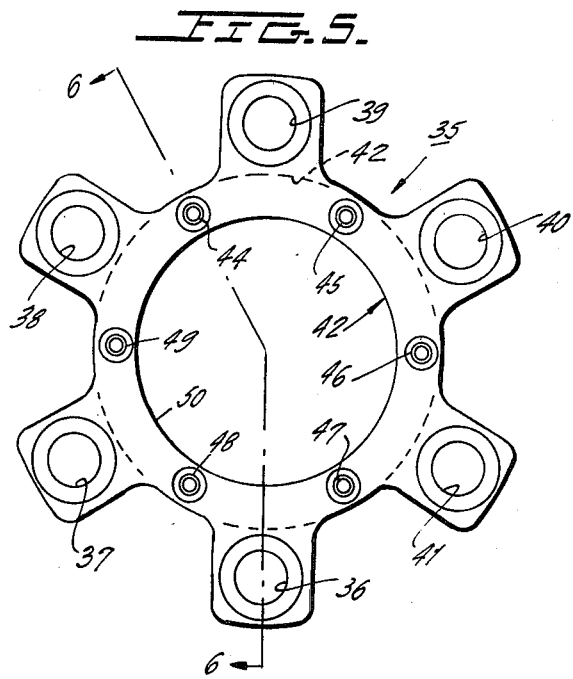
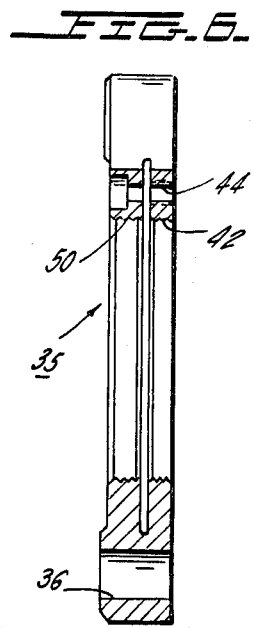
INVENTOR
JOHN H. GOLOTA
By
OSTROLENK, FABER, GERB & SOFFEN
ATTORNEYS

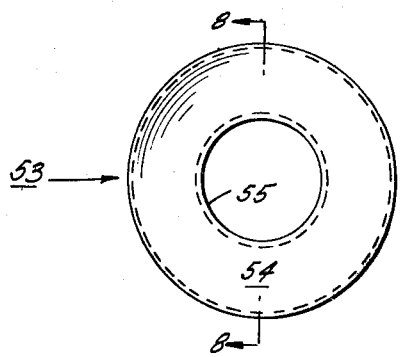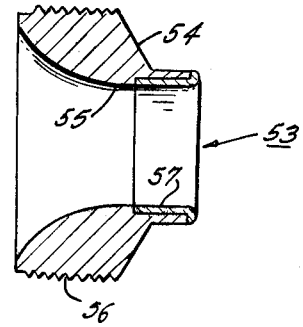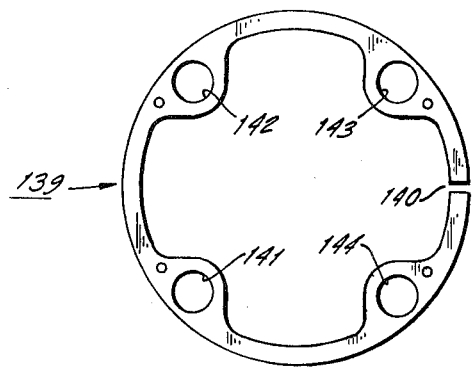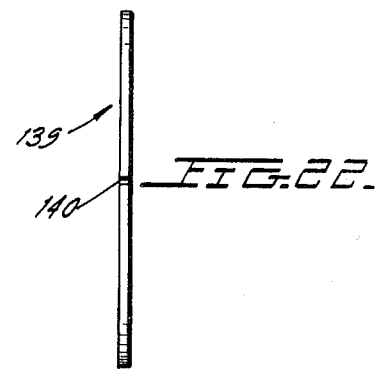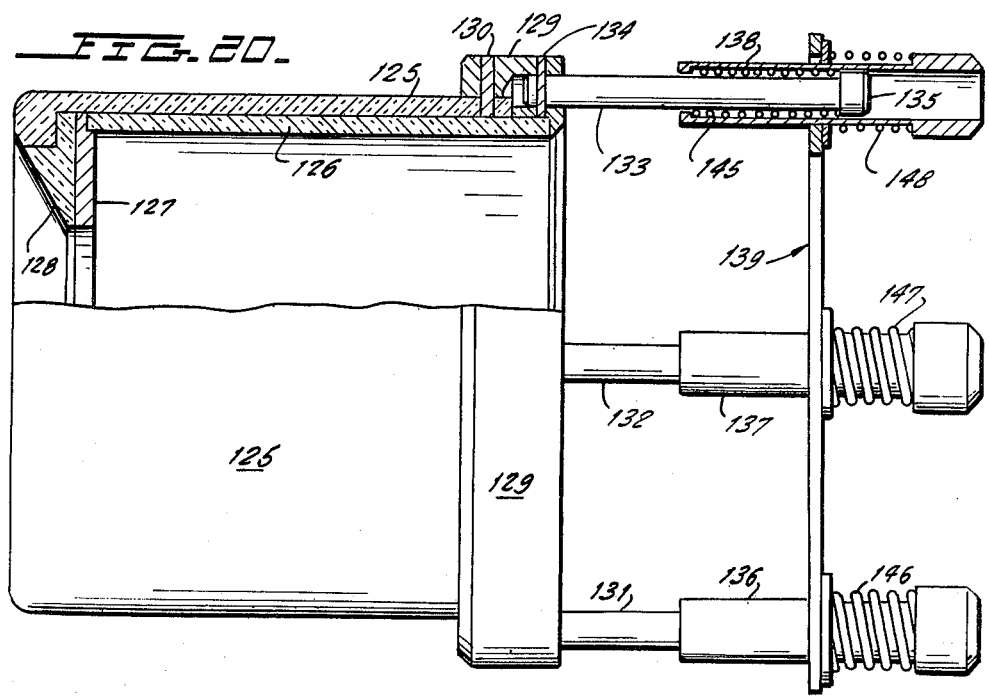

Feb. 10, 1970  J. H. GOLOTA  3,495,057
DUAL SLIDE VALVE WITH LOST MOTION MEANS FOR GAS BLAST BREAKER
Filed Nov. 6, 1967  8 Sheets-Sheet 5
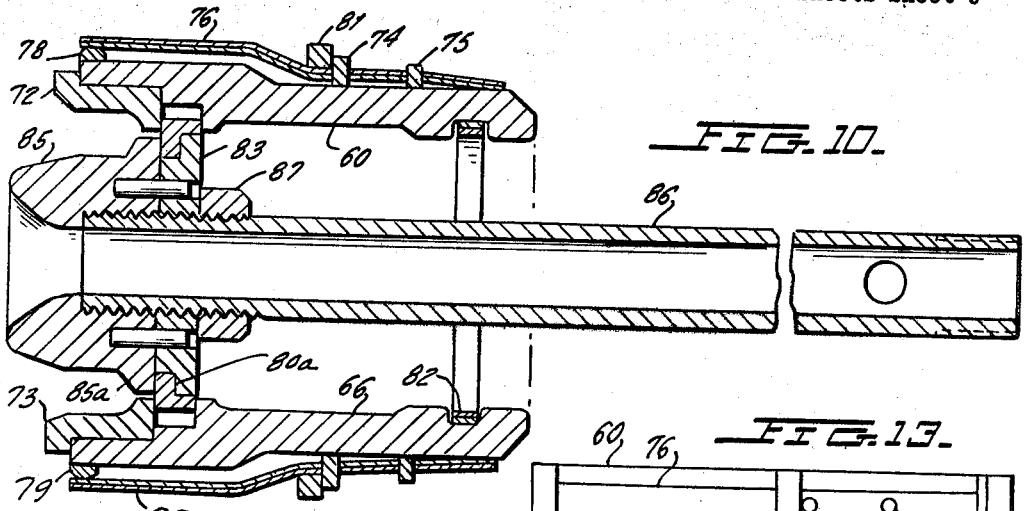
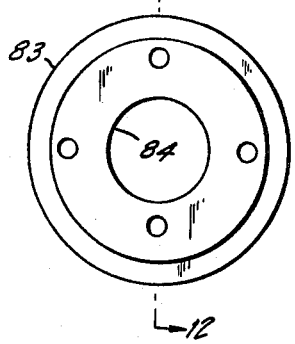
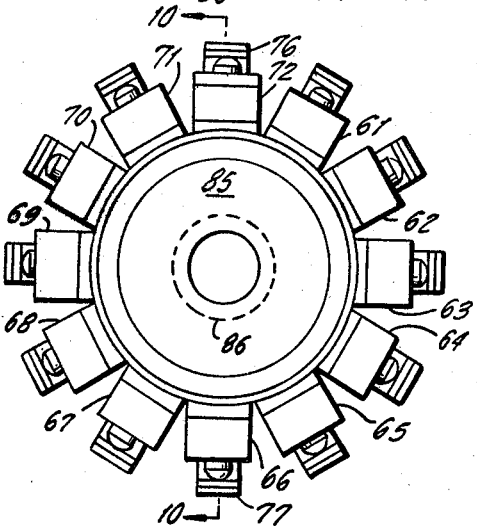
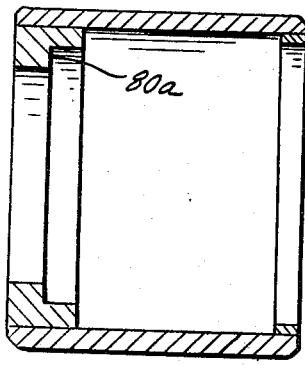
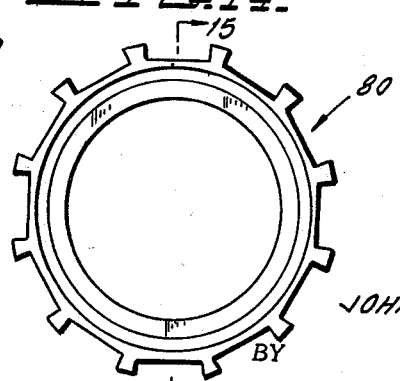
INVENTOR.
JOHN H. GOLOTA
BY
OSTROLENK, FABER, GERB & SOFFEN
ATTORNEYS

INVENTOR.
JOHN H. GOLOTA
BY
OSTROLENK, FABER, GERB & SOFFEN
ATTORNEYS

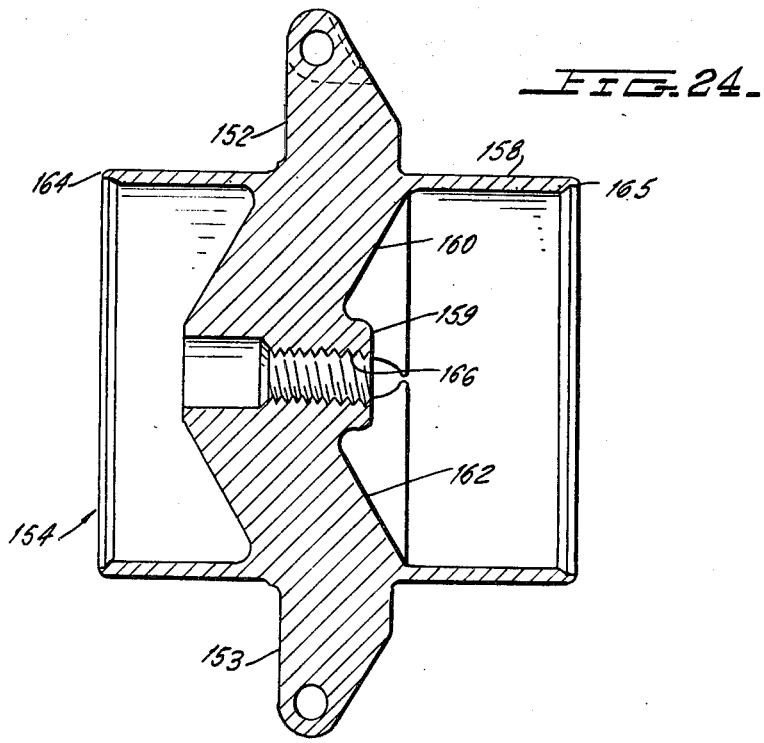
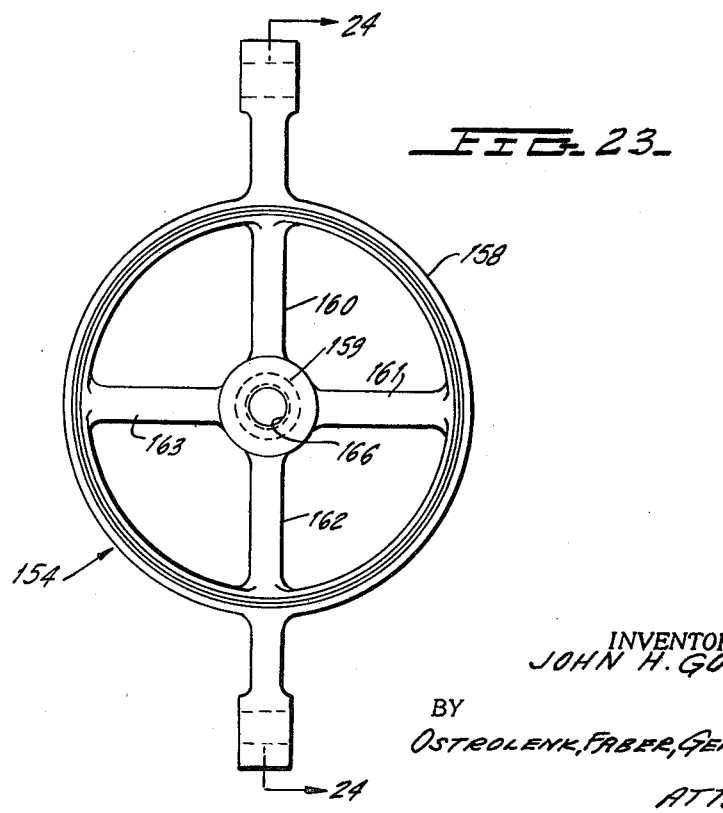

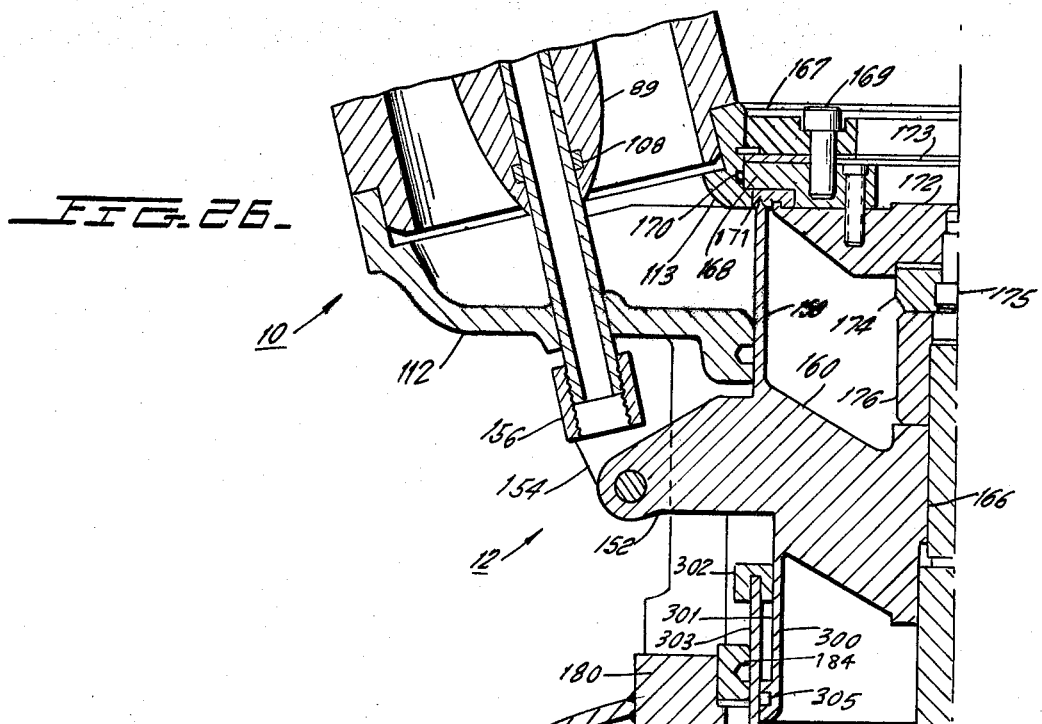

United States Patent Office

3,495,057
Patented Feb. 10, 1970

3,495,057
DUAL SLIDE VALVE WITH LOST MOTION MEANS FOR GAS BLAST BREAKER
John H. Golota, Los Angeles, Calif., assignor, by mesne assignments, to I-T-E Imperial Corporation, Philadelphia, Pa., a corporation of Delaware
Filed Nov. 6, 1967, Ser. No. 680,850
Int. Cl. H01h 33/82
U.S. Cl. 200—148                7 Claims

ABSTRACT OF THE DISCLOSURE

The main cylindrical blast valve of a gas blast circuit breaker is axially moved between an upper and lower sealing ring, with gas flow permitted while the cylindrical valve is in transit. An auxiliary slide valve is mounted concentric with the main valve and engages the lower sealing ring while the main valve is in transit from the bottom seal to the upper seal and until just before the main valve engages the upper seal to limit the amount of gas which can flow during closing of the contacts.

---

This invention relates to high voltage gas blast circuit breakers, and more particularly relates to a blast valve arrangement for such circuit breakers.

This invention is an improvement over the valve structure shown in my copending applications Ser. No. 680,778, filed Nov. 6, 1967, entitled "Adjustable Contact Nozzle and Retractable Arcing Chamber for Gas Blast Circuit Breakers"; and Ser. No. 680,777, filed Nov. 6, 1967, entitled "Axially Vented Contact and Interrupter Structure for Gas Blast Circuit Breakers"; and also Ser. No. 547,-621, now Patent No. 3,436,505, in the name of Daniel H. McKeough, filed May 4, 1966, entitled "Slide Valve for Gas Blast Breakers," with all of these applications being assigned to the assignee of the present invention.

The blast valve shown in the above applications is a cylindrical body mechanically connected to the movable contact and movable between spaced valve seats. Thus, when the contact is operated, the valve is opened and high pressure gas flows to the separating contacts while the contacts are in motion and while the valve is in transit between its valve seats.

As is well known, the gas blast during contact closing need not be as copious as during contact opening. In accordance with the present invention, an auxiliary sliding valve is concentrically mounted on the main valve to limit the gas flow during contact closing and while the main valve is in transit during the contact closing stroke. The novel auxiliary valve is mounted on the main valve with a lost motion connection, and is dimensioned to be held, by differential pressure, on the lower valve seat while the main valve moves toward the valve closed-contacts closed position. However, as the main valve nears its closed position, the lost motion is fully taken up and the auxiliary valve is opened to permit a limited gas blast just before the contacts close.

Accordingly, a primary object of this invention is to provide a novel valve structure for gas blast circuit breakers which preserves the gas supply.

Another object of this invention is to provide a novel dual valve structure for gas blast breakers which permits a copious gas blast during contact opening, and a limited gas blast during contact closing.

These and other objects of this invention will become apparent from the following description when taken in connection with the drawings, in which:

FIGURE 3 is a top view of the upper adaptor of FIGURES 1 and 2.

FIGURE 4 is a cross-section of FIGURE 3 taken across the section line 4—4 in FIGURE 3.

FIGURE 5 is a top view of the lower adaptor of FIGURES 1 and 2 which is located below the upper adaptor of FIGURES 3 and 4.

FIGURE 6 is a cross-sectional view of FIGURE 5 taken across the section line 6—6 in FIGURE 5.

FIGURE 7 is a top view of the stationary contact of the interrupter of FIGURE 2.

FIGURE 8 is a cross-section view of the contact of FIGURE 7 taken across the section line 8—8 in FIGURE 7.

FIGURE 9 is a top view of the movable contact assembly of FIGURES 1 and 2.

FIGURE 10 is a cross-section of FIGURE 9 taken across the section line 10—10 in FIGURE 9.

FIGURE 11 is a top view of the locking disk of FIGURE 10.

FIGURE 12 is a cross-section view of FIGURE 11 taken across section line 12—12 in FIGURE 11.

FIGURE 13 is a front view of one of the contact fingers of FIGURE 10.

FIGURE 14 is a top view of the contact finger retainer of FIGURE 10.

FIGURE 15 is a cross-section view of FIGURE 14 taken across the section line 15—15 in FIGURE 14.

FIGURE 20 is a plan view, partially in section, of the movable interrupter tube assembly.

FIGURE 21 is a plan view of the retainer of FIGURE 20.

FIGURE 22 is a side view of FIGURE 21.

FIGURE 23 is a top view of the cylindrical air control valve.

FIGURE 24 is a cross-section view of FIGURE 23 taken across section line 24—24 of FIGURE 23.

FIGURE 25 shows the valve structure of FIGURE 24 as modified in accordance with the present invention.

FIGURE 26 is similar to portions of FIGURE 2 but shows the use of the novel valve of FIGURE 25.

FIGURE 27 shows an enlarged cross-section of the valve engaging end of the auxiliary valve of the present invention.

FIGURES 1 to 24 illustrate an interrupter of the type shown in the above-noted applications. FIGURES 25, 26 and 27 describe the specific improvement of the invention which is preferably used in the apparatus of FIGURES 1 to 24.

Figure 1:
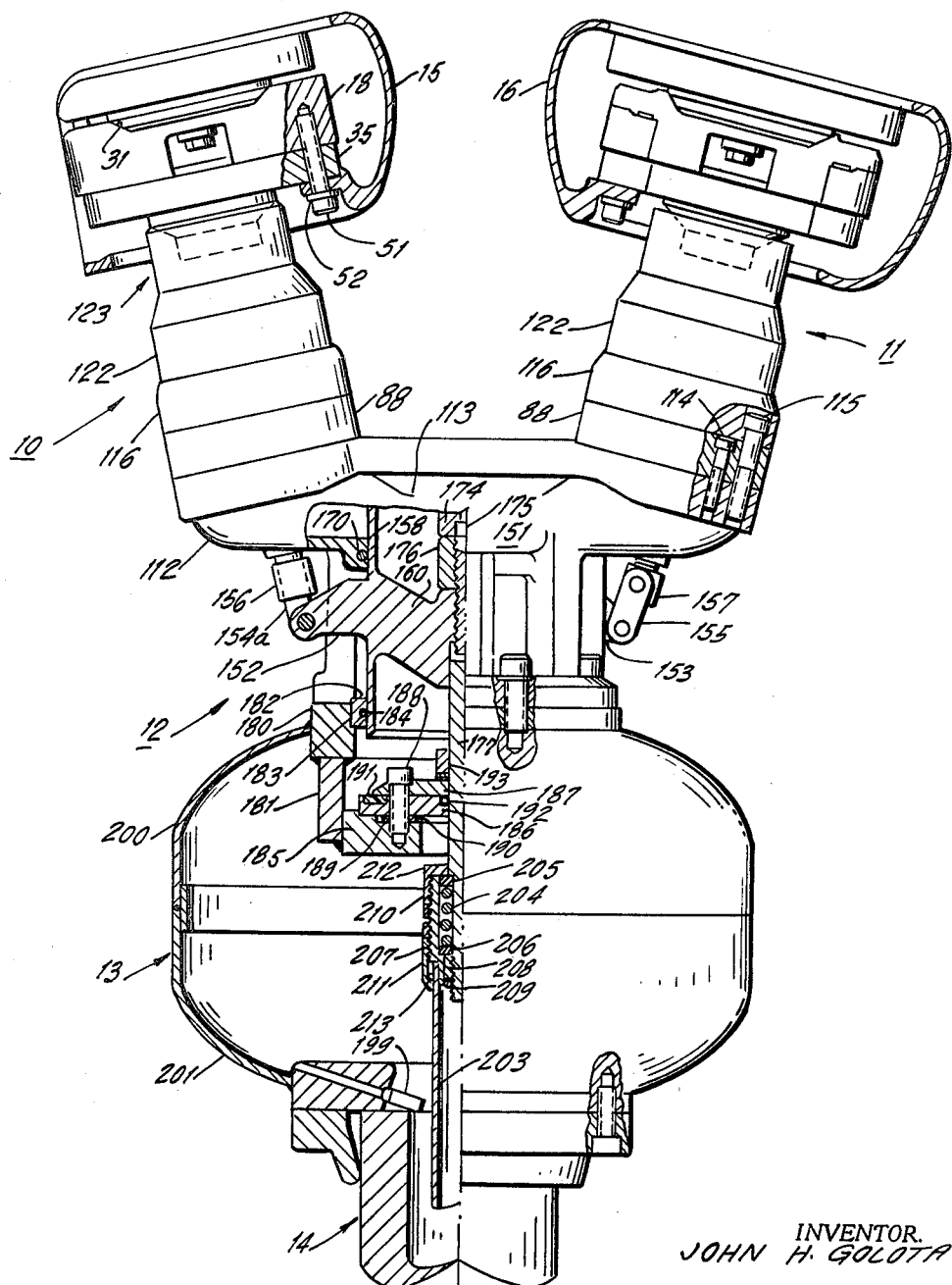
FIGURE 1 is a side view, partially in section, showing an entire assembly of the interrupters and operating mechanism of an air blast circuit breaker made in accordance with the present invention.

FIGURE 1 shows the assembly of the novel interruter assembly of the invention, and illustrates two series connected interrupters 10 and 11. Interrupters 10 and 11 are identical and will be described in detail hereinafter. The interrupters 10 and 11 are controlled by an operating mechanism, generally indicated by numeral 12, which is supported on a tank housing 13. Tank housing 13 is, in turn, carried on an elongated insulation pedestal 14 which may be carried on a high pressure gas supply at ground potential, as will be later described in FIGURES 25 to 27.

Figure 2:
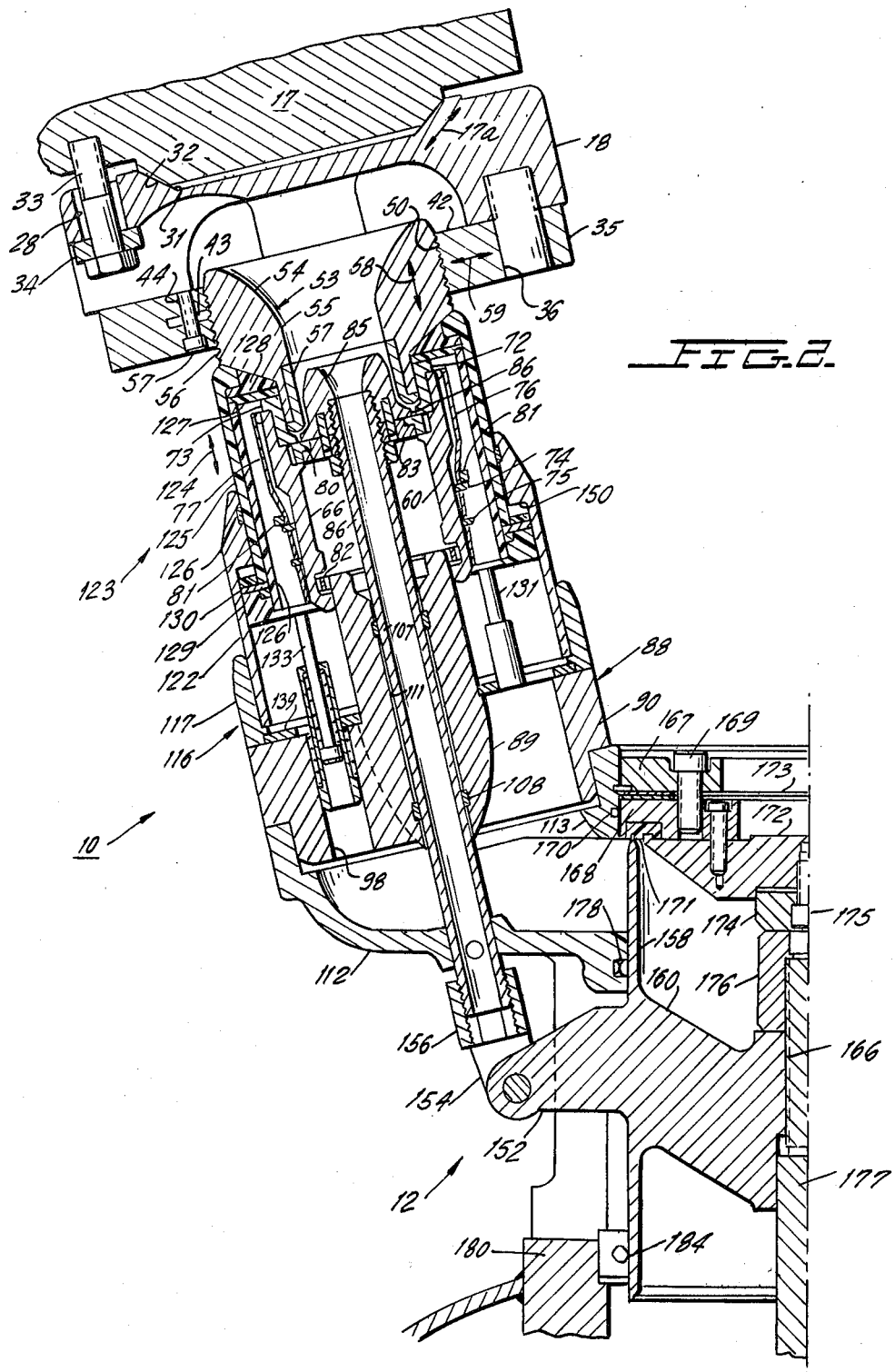
FIGURE 2 is a cross-sectional view of one of the interrupter assemblies of FIGURE 1.

Each of interrupters 10 and 11 are connected at their tops to insulator bushings, to be later described, which are connected in series with the circuit to be protected. The connection surrounding the tops of interrupters 10 and 11 and the insulator bushings are covered with corona shields 15 and 16. FIGURE 2 shows the connection of interrupter 10 to a lower portion 17 of an insulator bushing connected thereto.

An upper adaptor plate 18 (FIGURES 3 and 4) is provided which has a series of tapped openings therein, shown in FIGURE 3 as tapped openings 19 to 24, and alternate through openings 25 to 30. The upper surface of adaptor 18 then has a conical surface 31 which engages the conical lower surface 32 of insulator 17 to permit angular adjustment of insulator 17, as shown by arrow 17a in FIGURE 2. A series of bolts, such as bolt 33 having washer 34, then extend through openings, such as through-opening 28, to secure upper adaptor 18 to insulator 17.

A lower adaptor 35 is then provided, as shown in FIGURES 5 and 6, which has a pluralty of extending ears containing through-openings 36 to 41 extending from a central web 42. An annular groove 43 is cut through the web 42 so that it is held by the material of the extending ears. A plurality of through-holes and aligned tapped openings 44 to 49 are then formed in the web 42, and the interior web surface is threaded by thread 50. The through-openings 36 to 41 in lower adaptor 35 are then aligned with tapper openings 25 to 30 in upper adaptor 18 (FIGURE 3), and suitable bolts and washers, such as bolt 51 and washer 52, shown in FIGURE 1, secure shield 15 and adaptor plates 18 and 35 together.

The interior thread 50 of web 42 of lower adaptor 35 receives the stationary contact 53 of the interrupter. Contact 53 is shown in FIGURES 7 and 8 and comprises a main body 54 having a central opening 55 which tapers outwardly to define a blast orifice. The outer diameter of body 54 is threaded with a thread 56, and an arc-resistant insert 57. Thread 56 of contact 53 is then threaded into thread 50 of lower adaptor 35 and is secured therein by tightening a plurality of bolts, such as bolt 57, shown in FIGURE 2, which pass through the through-openings in the lower part of web 42 and into the threaded opening 44. As these bolts are tightened, the upper and lower interior portions of web 42 tighten on thread 56 to hold contact 53 securely. Note that the axial contact position is easily controlled by threading contact 53 more or less into thread 50, as shown by arrow 58 in FIGURE 2. Moreover, by providing clearance between the outer diameter of the bolts, such as bolt 51, which secure lower adaptor 35 to upper adaptor 18 and the corresponding through-openings, such as opening 36, lateral adjustment can be obtained for contact 53, as shown by arrow 59 in FIGURE 2.

The movable contact assembly of FIGURES 1 and 2 is best shown in detail in FIGURES 9 to 15.

The movable contact assembly is composed of a circular cluster of contact fingers 60 to 71, each having generally rectangular shape, shown in FIGURE 13 for contact 60. Each of the contact fingers have arc-resistant inserts secured thereto, such as inserts 72 and 73, secured to contacts 60 and 66, respectively. Each of the contact fingers have two projections, such as projections 74 and 75, for finger 60 in FIGURES 10 and 13, which receive biasing leaf springs, shown as leaf springs 76 and 77 for contacts 60 and 66 which bear on insulation buttons 78 and 79, respectively.

The contacts 60 to 71 are laid on the outer notches in contact retainer 80, shown in FIGURES 14 and 15, and are held on the retainer 80 by a spring retainer 81 which encircles the central exterior portions of the contacts. A spring 82, shown in FIGURE 10, extends around the bottom interior of the contacts.

A locking disk 83, shown in FIGURES 11 and 12, having a central opening 84, is inserted into retainer 80 and into engagement with shoulder 80a of retainer 80. A movable arcing contact 85 is then secured to locking disk 83, as by pins extending from disk 83 to arcing contact 85. It will be noted that arcing contact 85 has a bottom flange 85a which has an outer diameter that engages the arcing contact tips of the arcing contact fingers to limit their inward collapse and to provide commutation of the arc from insert 72 to contact 85 during opening. The interior of arcing contact 85 is threaded and threadably receives the end of operating shaft 86 and is secured thereon by locking nut 76, best shown in FIGURE 10.

Figure 17:
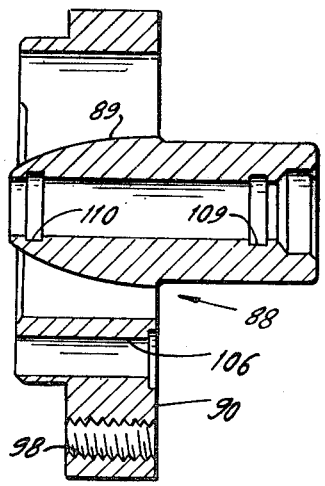
FIGURE 17 is a cross-section of FIGURE 16 taken across the section line 17—17 in FIGURE 16.
Figure 16:
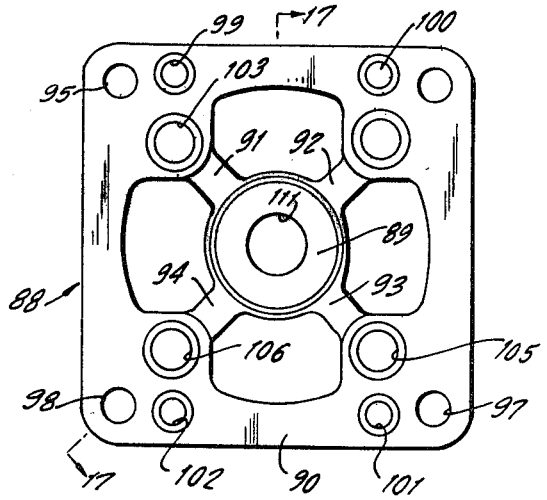
FIGURE 16 is a top view of the interrupter support.

FIGURES 16 and 17 show the interrupter support 88 for slidably holding the movable contact assembly of FIGURE 10. Support 88 contains a central stationary contact portion 89, the outer end of which slidably receives the lower ends of contact fingers 60 and 71 in slidable engagement. Central portion 89 is connected to base portion 90 by four streamlined webs 91, 92, 93 and 94 (FIGURE 16). Base 90 has two sets of four through-openings 95 to 98 and 99 to 102 in the corners thereof, and a set of through-openings 103 to 106, respectively, in the corners thereof. Two rings 107 and 108 of insulating material, shown in FIGURE 2, are contained in internal grooves 109 and 110, respectively, in the central opening 111 of central portion 89, shown in FIGURES 15 and 16, to seal around the operating rod 86, and to provide electrical insulation between rod 86 and base 90 as shown in FIGURE 2. Support 88 is then fastened to support casting section 112 and 113 (which are parts of a common casting) of FIGURES 1 and 2, as by bolts which pass through openings 95 to 102 into appropriate tapped openings in casting sections 112 and 113, partly shown in FIGURE 1 by bolts 114 and 115. Note that the operating rod 86 passes through a suitable opening, which may be sealed, in casting section 112.

Figure 19:
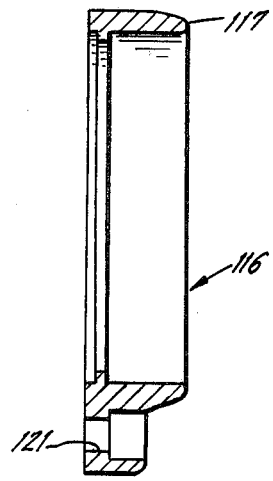
FIGURE 19 is a cross-section of FIGURE 18 taken across section line 19—19 in FIGURE 18.
Figure 18:
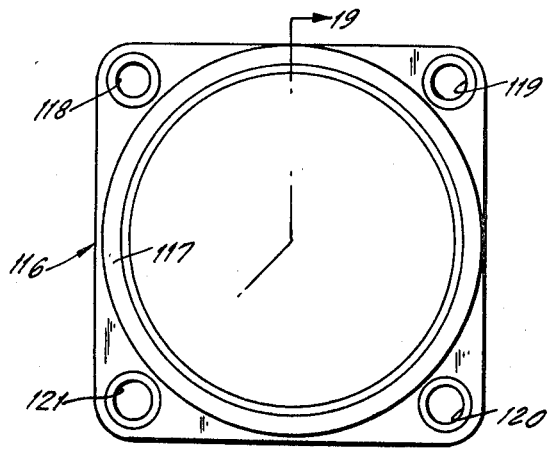
FIGURE 18 shows a top view of the interrupter tube flange.

An interrppter tube assembly, arranged above the support 88 and enclosing the contact area is carried on a flange 116, shown in FIGURES 18 and 19. Flange 116 comprises an extending cylindrical portion 117 and four through-openings 118 to 121 in the corners thereof. Flange 116 is secured to support 88 beneath it by the four bolts (not shown) extending through openings 118 to 121 in flange 116 and respective openings 95 to 98 in support 88 (FIGURE 16), which bolts are threaded into the castings 112 and 113.

An interrupter tube 122 is then secured to extension 117 in any suitable manner, where tube 122 is of glass fiber, or the like. Tube 122 then slidably receives the movable interrupter tube portion 123, which is movable in the direction of arrow 124, with a gasket 125 between the surfaces of tube 122 and sliding portion 123.

The sliding interrupter tube portion 123 is best understood by reference to FIGURES 20, 21 and 22. Referring to FIGURE 20, the movable interrupter tube comprises an outer insulation cylinder 125 and an inner lining cylinder 126 which secure, between them, an insulation lining disk 127 and baffle ring 128. The bottom of the cylinders are secured by ring 129 which has a lower lip extending below liner 126 and a plurality of pins, such as pin 130, which extend into cylinder 125.

Four pins, three of which are shown as pins 131, 132 and 133 in FIGURE 20, then extend into openings in ring 129 and are locked therein by suitable locking pins, such as locking pin 134 for pin 133. Pins 131 and 133 are seen in FIGURE 2 with the four pins disposed 90° from one another. Each of the pins have enlarged heads such as head 135 of pin 133, shown in FIGURE 20, which are captured in housings, such as housings 136, 137 and 138 for pins 131 to 133, respectively. A split retainer spring disk 139, shown in FIGURES 21 and 22, which is split at portion 140, has four openings 141 to 144 for receiving the four spring housings, including housings 131, 132 and 133, as shown in FIGURE 20. Internal springs, such as spring 145 of housing 138, then bias the housings 136 to 138 toward the ring 129 and external springs 146, 147 and 148 bias plate 139 toward the ring 129.

In assembling the movable interrupter tube, it will be noted in FIGURE 2 that the periphery of plate 139 is captured between adaptor 116 and support 88, with ring 129 beneath shoulder 150 in stationary tube portion 122. Also, it is seen that the baffle ring lies just adjacent the lower tapered surface of contact 53.

The operating mechanism for moving operating rod 86 is best shown in FIGURE 1 where it is seen that the casting sections 112 and 113 have a downwardly extending portion 151. Portion 151 has two slots for passing ears 152 and 153 of cylindrical valve 154. The ears 152 and 153 are then connected to links 154a and 155, respectively, which are, in turn, pivotally connected to operating rods 86 for interrupters 10 and 11 through suitable couplings 156 and 157, respectively.

A blast valve is best shown in FIGURES 23 and 24 as comprising a cylindrical body 158 connected to a central hub 159 by streamlined arms 160 to 163. The ends of cylindrical body 158 are formed with valve disk engaging sections 164 and 165. The interior opening in hub 159 is provided with a thread 166. The two ears 152 and 153, shown above, then extend outward from cylindrical body 158.

Cylindrical valve body 158 then moves between an upper and lower valve seat. The upper valve seat is composed of an upper disk 167 which is secured to casting section 113 and a lower disk 168 which is bolted to disk 167 as by bolts such as bolt 169. Disk 168 is sealed with respect to casting section 113 by seal ring 170 and carries a main valve seat ring 171 which cooperates with the upper end of cylindrical valve body 158. A valve retaining disk 172 is bolted to disk 168 as by bolt 173 and securely holds ring 171 in position. Disk 172 also has a buffer disk 174 bolted thereto as by bolt 175 which engages cylinder 176 when the valve 154 is moved upwardly.

Hub 159 is threaded on operating shaft 177 and is locked in place by nut 176 which is also threaded on shaft 177. Note that an annular seal 178 is contained in casting portion 112 and seals around cylinder 158 and guides the motion of cylinder 158.

A ring 180 (FIGURES 1 and 2) is then secured to the bottom of casting 112, and downwardly projecting members 181 are welded to ring 180. Members 181 then support the lower valve seal for valve 154. Note that a ring 182 having a sealing ring 183 engaging ring 182 is provided with a sliding seal ring 184 which surrounds the lower portion of cylinder 158.

The bottom of members 181 carries a ring 185. Ring 185 is connected to valve disk 186 and valve retainer disk 187 by bolt means, such as bolt 188. Sealing rings 189 and 190 prevent leakage between rings 185 and 186. Ring 186 carries a main valve seat 191 which cooperates with the bottom of cylinder 158. Note that a sliding seal 192 is formed between disk 186 and shaft 177, and that a buffer 193 is connected to the top of disk 187 to receive the bottom of hub 159 when valve 158 moves down.

The ring 180 is welded to high pressure tank 13 which is composed of welded upper and lower halves 200 and 201, respectively. High pressure gas, such as air and preferably sulfur hexafluoride, is then supplied to the interior of tank 13 from the central channel through insulator 14 which is appropriately connected at its bottom to a high pressure gas source, as will be later described.

An elongated operating shaft 203, which extends coaxially with insulator 14, can be moved up and down by operating means, to be later described, which may be carired at ground, and is connected to shaft 177 by a shock-absorbing coupling.

FIGURE 1 further shows a small tubular member extending downwardly and into the annular space between pedestal 14 and rod 203, and arranged so that any gas which condenses on the surface of housing 13 will flow downwardly and freely through the annular space without impinging on the insulating surfaces of members 14 and 203.

The coupling as shown in FIGURE 1 is comprised of a spring 204 captured between rings 205 and 206 at its top and bottom, and an outer cylinder 207 on its outer periphery. Ring 205 is captured beneath a shoulder in shaft 177 as shown, while ring 206 is held by nuts 208 and 209 which are threaded on the threaded bottom of shaft 177. Outer shells 210 and 211 each have threaded interiors, threaded on the outer threaded surface of cylinder 207 with extension 212 of shell 210 bearing on ring 205, while ring 206 seats under the interior shoulder in cylinder 207. Operating shaft 203 is then connected to shell 211 by connection ring 213. When shaft 203 moves down, it will be seen that downward force is exerted through shells 211, 210, ring 205, and spring 204 on ring 206. Similarly, upward movement of shaft 203 is transmitted through cylinder 207, ring 206, spring 204, and ring 205. Thus, both upward and downward movement of shaft 203 is transmitted to shaft 177 through shock-absorbing spring 204.

The specific improvement of the invention is shown in FIGURES 25, 26 and 27.

Referring to FIGURE 25, and as compared to FIG. 24, it will be seen that the left-hand portion of cylinder 154 has been modified whereby the diameter of portion 300 is reduced to form an exterior annular slot 301. Slot 301 then receives a sliding seal ring 302 which is secured, as by pins or the like (not shown) to cylinder 303 which has a valve disk engaging end 304. A sealing ring 305 is carried in member 300 to form a seal between member 300 and cylinder 303. Both the valve disk engaging end 304 of cylinder 303 and the valve disk engaging end of member 300 can engage seal ring 191, shown in FIGURE 26.

In operation, and when valve cylinder 158 is sealed to upper seal 171 and the contacts are closed, cylinder 303 will be held in an upper most position with surface 306 engaging the bottom of the ring holding seal 184 due to the differential pressure on the areas exposed at diameters $D_2$ and $D_1$, shown in FIGURE 27, corersponding to the thickness of cylinder 303.

On the opening stroke, as valve 158 moves down, the top of groove 301, which acts as a lost motion connection to cylinder 303, engages ring 302 and both move down to seat on seal 191 to shut off the blast, with the arc between the open contacts having been extinguished.

When the contacts are open, valve 158 moves upwardly and the contacts begin moving closed. The cylinder 303, however, and its valve engaging section 305 continue to engage valve seat 191 to prevent a gas blast due to the differential pressure above diameters $D_3$ and $D_2$, shown in FIGURE 27, this annular area engaging seal 191. Just before the very end of the closing stroke, the bottom of groove 301 hits the bottom of ring 302, thereby opening the seal formed by cylinder 303 and its ends 305, to permit a short gas blast just before the contacts close. The differential pressure on the area formed between diameters $D_1$ and $D_2$ hold the cylinder 303 in this open position until the next valve operation.

Although this invention has been described with respect to its preferred embodiments, it should be understood that many variations and modifications will now be obvious to those skilled in the art, and it is preferred, therefore, that the scope of the invention be limited not by the specific disclosure herein.

The embodiments of the invention in which an exclusive privilege or property is claimed are defined as follows:

1. In a high voltage gas blast circuit breaker; a stationary contact, a movable contact movable into and out of engagement with said stationary contact, an operating means, a source of high pressure gas, and a valve for connecting said high pressure gas to the region of engagement and disengagement of said movable and and stationary contacts; said valve comprising a first annular valve seat, a second annular valve seat coaxial with and axialy spaced from said first valve seat, a first movable hollow cylinder having a length shorter than the spacing betwen said first and second valve seats and movable betwen said first and second valve seats and into sealing engagement with one or the other of said first or second valve seats; said high pressure gas being isolated from said region when said first cylinder is sealed to said first or second annular valve seat and directed thereto when said first cylinder is in transit between said first and second valve seats; said operating means connected to said first cylinder and said movable contact for moving said first cylinder and said contact jointly; a second cylinder slidably and coaxialy mounted on said first cylinder and slidable into and out of sealing engagement with said second valve seat; and means on said second cylinder for holding said second cylinder in engagement with said second valve seat for a portion of the time said first cylinder is in transit toward said first valve seat.

2. These device as set forth in claim 1 wherein said operating means jointly moves said first cylinder toward said first valve seat and said movable contact toward said stationary contact, and wherein said operating means jointly moves said first cylinder toward said second valve seat and said movable contact away from said stationary contact.

3. The device as set forth in claim 1 which includes a lost motion connection between said first and second cylinders; said lost motion connection comprising a radial extension on said second cylinder and a groove in said first cylinder receiving said ring; said groove having a length long enough to permit said first cylinder to move for a substantial distance toward said first valve seat while said second cylinder engages said second valve seat before the end of said groove reaches said radial extension; said first and second cylinder thereafter moving together.

4. The device as set forth in claim 1 wherein said second cylinder is exterior of said first cylinder.

5. The device as set forth in claim 2 which includes a lost motion connection between said first and second cylinders; said lost motion connection comprising a radial extension on said second cylinder and a groove in said first cylinder receiving said ring; said groove having a length long enough to permit said first cylinder to move for a substantial distance toward said first valve seat while said second cylinder engages said second valve seat before the end of said grove reaches said radial extension; said first and second cylinders thereafter moving together and wherein said second cylinder is exterior of said first cylinder.

6. The device as set forth in claim 3 wherein said means for holding said second cylinder includes an outwardly extending section surrounding said second cylinder having first and second opposing surfaces of larger and smaller areas respectively; said second surface of smaller area facing said second valve seat whereupon application of high pressure gas to said first and second surfaces causes movement of said second cylinder toward said second valve seat.

7. The device as set forth in claim 5 wherein said means for holding said second cylinder includes an outwardly extending section surrounding said second cylinder having first and second opposing surfaces of larger and smaller areas respectively; said second surface of smaller area facing said second valve seat whereupon application of high pressure gas to said first and second surfaces causes movement of said second cylinder toward said second valve seat.

References Cited

UNITED STATES PATENTS

| | | | |
|---|---|---|---|
| 3,100,001 | 8/1963 | Forwald | 137—630.19 X |
| 3,268,697 | 8/1966 | Morioka | 200—148 |
| 3,436,505 | 4/1969 | McKeough | 200—148 |

FOREIGN PATENTS 821,659  10/1959  Great Britain.

ROBERT S. MACON, Primary Examiner

ROBERT A. VANDERHYE, Assistant Examiner

U.S. Cl. X.R.

137—630.19, 614.13

UNITED STATES PATENT OFFICE
CERTIFICATE OF CORRECTION

Patent No. 3,495,057          Dated February 10, 1970

Inventor(s) John H. Golota

It is certified that error appears in the above-identified patent and that said Letters Patent are hereby corrected as shown below:

In Column 7, line 3, "betwen" should be --- between ---

In Column 7, line 4, "betwen" should be --- between ---

In Column 7, line 31, "ring" should be --- radial extension ---

In Column 8, line 2, "ring" should be --- radial extension ---

Signed and sealed this 14th day of December 1971.

(SEAL)
Attest:

EDWARD M. FLETCHER, JR.
Attesting Officer

ROBERT GOTTSCHALK
Acting Commissioner of Patents